(12) United States Patent
Klaas et al.

(10) Patent No.: US 8,833,700 B2
(45) Date of Patent: Sep. 16, 2014

(54) COVER PLATE, DOOR COVERING AND AIRCRAFT OR SPACECRAFT

(71) Applicants: Andrej Klaas, Hamburg (DE); Michael Stohl, Hamburg (DE); Rolf Hinrichs, Hamburg (DE)

(72) Inventors: Andrej Klaas, Hamburg (DE); Michael Stohl, Hamburg (DE); Rolf Hinrichs, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 52 days.

(21) Appl. No.: 13/652,069

(22) Filed: Oct. 15, 2012

(65) Prior Publication Data

US 2013/0105630 A1 May 2, 2013

Related U.S. Application Data

(60) Provisional application No. 61/552,207, filed on Oct. 27, 2011.

(30) Foreign Application Priority Data

Oct. 27, 2011 (DE) .......................... 10 2011 085 269

(51) Int. Cl.
B64C 1/14 (2006.01)
(52) U.S. Cl.
CPC .................................... B64C 1/1407 (2013.01)
USPC ..................................... 244/129.5; 244/129.4
(58) Field of Classification Search
USPC .................... 244/129.4, 129.5, 130, 131, 1 N; 49/460, 462; 277/637, 644, 651
See application file for complete search history.

(56) References Cited

U.S. PATENT DOCUMENTS

| 5,018,687 | A | * | 5/1991 | Kupfernagel et al. | ..... 244/129.5 |
| 5,181,677 | A | * | 1/1993 | Kaplan et al. | ............. 244/129.5 |
| 5,259,576 | A | * | 11/1993 | Howard | ..................... 244/129.5 |
| 5,673,874 | A | * | 10/1997 | Howard | ..................... 244/129.5 |
| 7,240,905 | B1 | * | 7/2007 | Stahl, Sr. | ..................... 277/652 |
| 7,878,454 | B2 | * | 2/2011 | Lamat et al. | ............... 244/129.5 |
| 8,342,452 | B2 | * | 1/2013 | Candela et al. | .............. 244/130 |
| 2008/0093504 | A1 | * | 4/2008 | Lamat et al. | ............... 244/129.5 |
| 2010/0096504 | A1 | * | 4/2010 | Candela et al. | ............ 244/129.4 |

FOREIGN PATENT DOCUMENTS

DE 10 2005 061 127 7/2007

OTHER PUBLICATIONS

German Office Action for Application No. 10 2011 085 269.7 dated Mar. 20, 2013.

* cited by examiner

Primary Examiner — Philip J Bonzell
(74) Attorney, Agent, or Firm — Jenkins, Wilson, Taylor & Hunt, P.A.

(57) ABSTRACT

The present invention provides a cover plate for covering at least portions of a door gap formed between a door covering and a fuselage cell of an aircraft or spacecraft, comprising: a fastening portion by which the cover plate can be mounted on an outer surface of the door covering; a contact portion which rests in a contacting manner against an outer skin of the fuselage cell when the door covering is closed; at least one corner portion associated with a corner of the door covering; and a side portion associated with a side of the door covering, the at least one corner portion and the side portion being configured to press the contact portion with a constant contact pressure against the outer skin of the fuselage cell when the door covering is closed. The present invention further provides a door covering for an access opening in a fuselage cell of an aircraft or spacecraft having a cover plate of this type as well as an aircraft or spacecraft having a cover plate of this type and/or having a door covering of this type.

10 Claims, 6 Drawing Sheets

COVER PLATE, DOOR COVERING AND AIRCRAFT OR SPACECRAFT

CROSS-REFERENCE TO RELATED APPLICATIONS

This application claims the benefit of and priority to U.S. Provisional Application No. 61/552,207, filed Oct. 27, 2011, and German Patent Application No. DE 10 2011 085 269.7, filed Oct. 27, 2011, the entire disclosures of which are incorporated herein by reference.

FIELD OF THE INVENTION

The present invention relates to a cover plate for covering a door gap formed between a door covering and a fuselage cell of an aircraft or spacecraft, to a door covering for an access opening in a fuselage cell of an aircraft or spacecraft having a cover plate of this type and to an aircraft or spacecraft having a cover plate of this type and/or having a door covering of this type.

Although the present invention can be applied to any aircraft or spacecraft, it will be described by way of example on the basis of an aircraft.

BACKGROUND OF THE INVENTION

In aircraft construction, cover plates are used to cover a door gap which is formed between a door covering and an access opening in a fuselage cell of the aircraft. Cover plates of this type are preferably mounted on the upper edge of the door covering. However, aircraft fitted with cover plates of this type might develop a considerable amount of noise. This noise development is due to the fact that the touching contact between the cover plate and the fuselage cell is not fully maintained during flight operation. This means that the cover plate lifts away at least in portions from the fuselage cell, as a result of which the cover plate starts to vibrate and produces a noise. This lifting-away of the cover plate is due to the fact that although the contact pressure of the cover plates is sufficiently high in corner regions of the door covering, it is significantly lower in an area between the corner regions. One possibility of preventing the development of vibrations on the cover plates is to reset the door coverings of the aircraft. However, a renewed resetting operation of this type might involve increased costs and time since the aircraft then has to undergo new flight tests. Furthermore, it has been found that the development of vibrations on the cover plates might not be reliably prevented even if the door coverings are reset.

BRIEF DESCRIPTION OF THE INVENTION

It is therefore an idea of the present invention to provide a cover plate which overcomes the above-mentioned disadvantages.

According thereto, a cover plate is provided to cover at least portions of a door gap formed between a door covering and a fuselage cell of an aircraft or spacecraft, comprising: a fastening portion by which the cover plate can be mounted on an outer surface of the door covering; a contact portion which rests in a contacting manner against an outer skin of the fuselage cell when the door covering is closed; at least one corner portion associated with a corner of the door covering; and a side portion associated with a side of the door covering, the at least one corner portion and the side portion being configured to press the contact portion with a constant contact pressure against the outer skin of the fuselage cell when the door covering is closed.

The fundamental idea of the present invention is for the contact pressure, by which the contact portion of the cover plate is pressed against the outer skin of the fuselage cell, to be kept constant over the entire region of the contact portion. This measure prevents the contact portion from being pressed against the outer skin of the fuselage cell with an insufficient contact pressure in parts of the contact portion which are susceptible to vibrations and consequently from being able to lift away from said outer skin during flight operation. This reliably prevents the development of vibrations and hence a disturbing development of noise.

According to a preferred embodiment of the cover plate, the at least one corner portion has a first precurvature directed towards the outer skin of the fuselage cell and the side portion has a second precurvature directed towards the outer skin of the fuselage cell, the second precurvature being greater than the first precurvature. Preferably, the at least one corner portion has a first rigidity and the side portion has a second rigidity, the second rigidity being greater than the first rigidity. This means that a greater pretension is produced in the region of the side portion than in the region of the at least one corner portion. Consequently, with simple constructive means, it is possible to achieve a constant contact pressure over the entire contact portion of the cover plate.

According to a further preferred embodiment of the cover plate, the cover plate comprises a core which is arranged between two skin layers of the cover plate. The core is formed in particular from a metal material, for example from a curved sheet. The skin layers preferably comprise a plastics material, in particular a fibre-reinforced plastics material. This reliably prevents corrosion of the core, thereby prolonging the service life of the cover plate. Furthermore, a high surface quality of the cover plate is achieved due to the skin layers.

According to yet another preferred embodiment of the cover plate, the core comprises a plurality of core elements. In particular, the core elements each have different first or second precurvatures directed towards the outer skin of the fuselage cell and/or different rigidities in each case. Thus, in a particularly simple manner, it is possible to provide a core having the desired characteristics, i.e. having the desired first and second precurvatures and the required rigidities, by assembling different standardised core elements. As a result, the core can be produced in a particularly simple and cost-effective manner.

According to a preferred embodiment of the door covering, the cover plate is mounted on an upper edge of the door covering. This prevents the development of noise, particularly in the region of the upper edge.

BRIEF DESCRIPTION OF THE DRAWINGS

In the following, the invention will be described in more detail on the basis of embodiments with reference to the accompanying schematic figures of the drawings.

In the figures, identical reference numerals denote identical or functionally identical components, unless indicated otherwise.

DETAILED DESCRIPTION OF THE INVENTION

Figure 1:
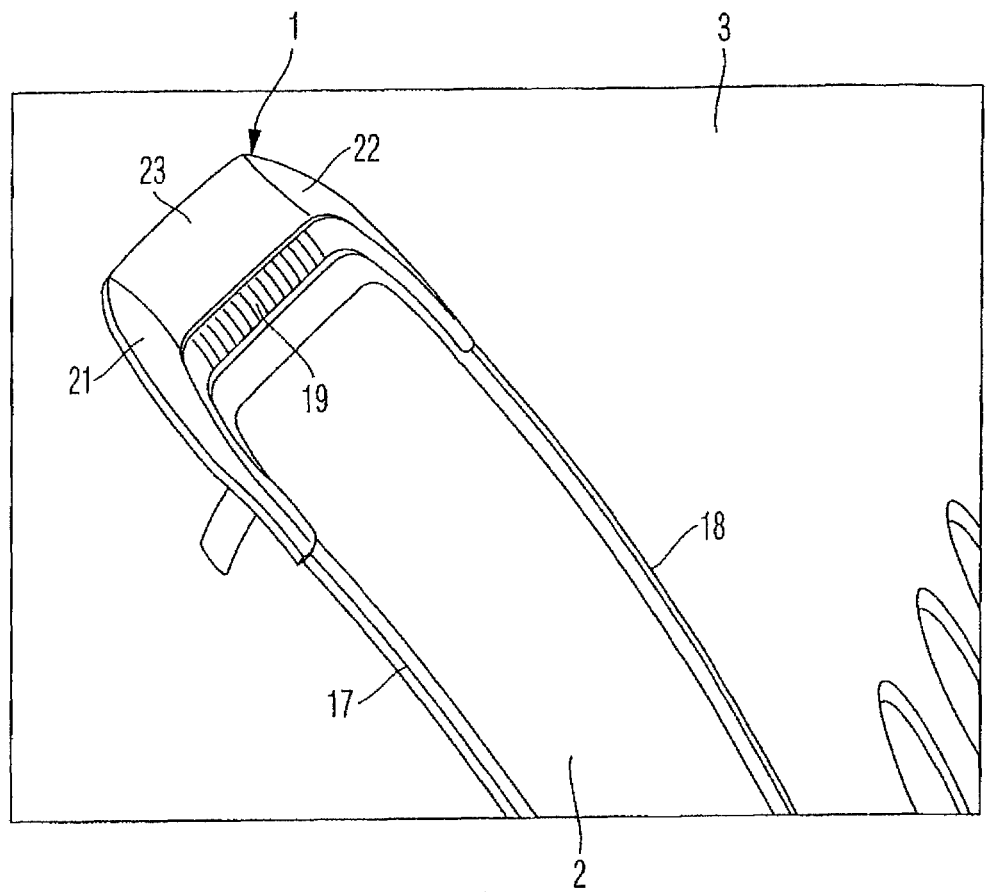
FIG. 1 is a perspective view of a preferred embodiment of a cover plate.
Figure 2:
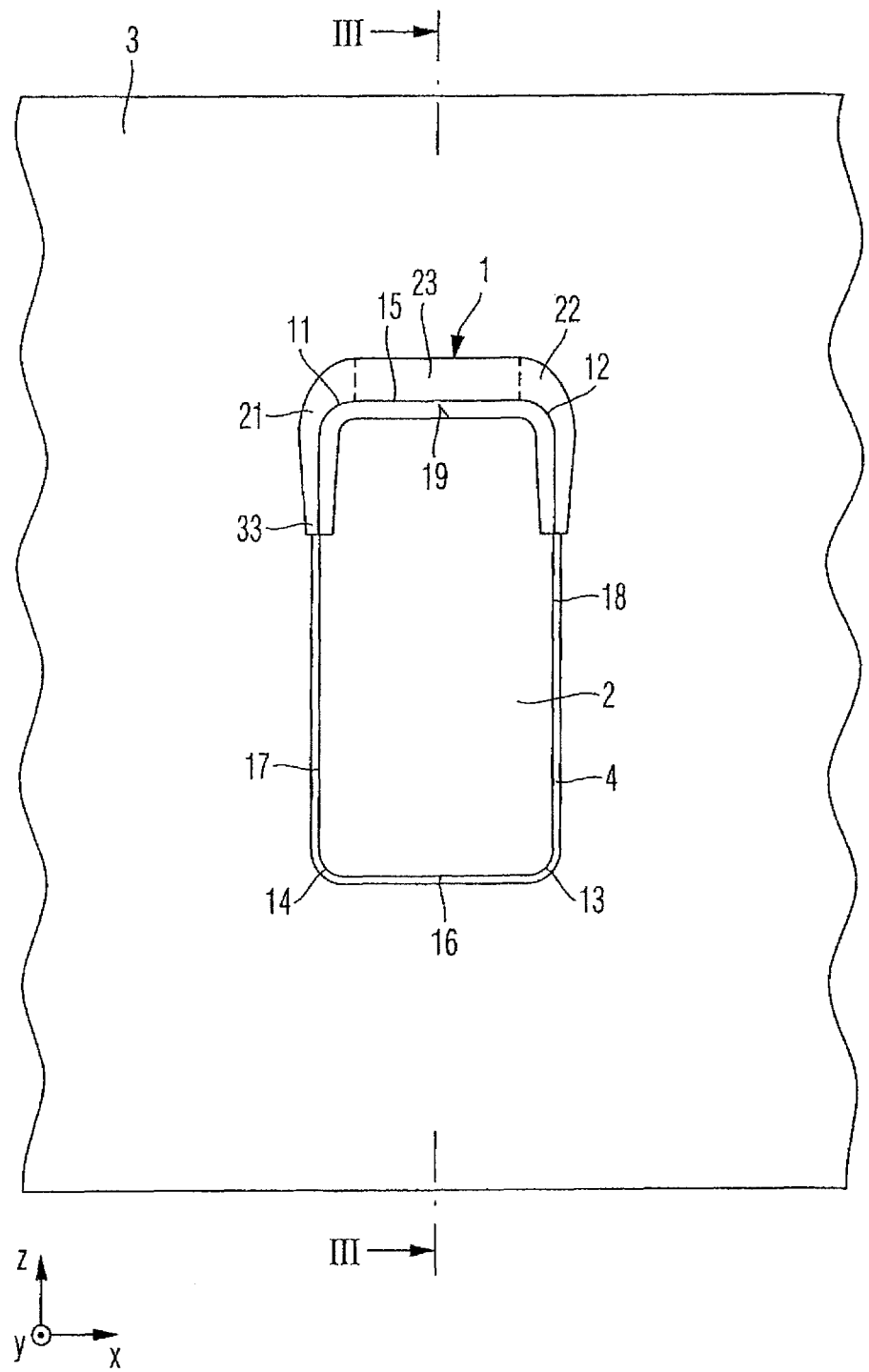
FIG. 2 is a plan view of the preferred embodiment of the cover plate according to FIG. 1.
Figure 3:
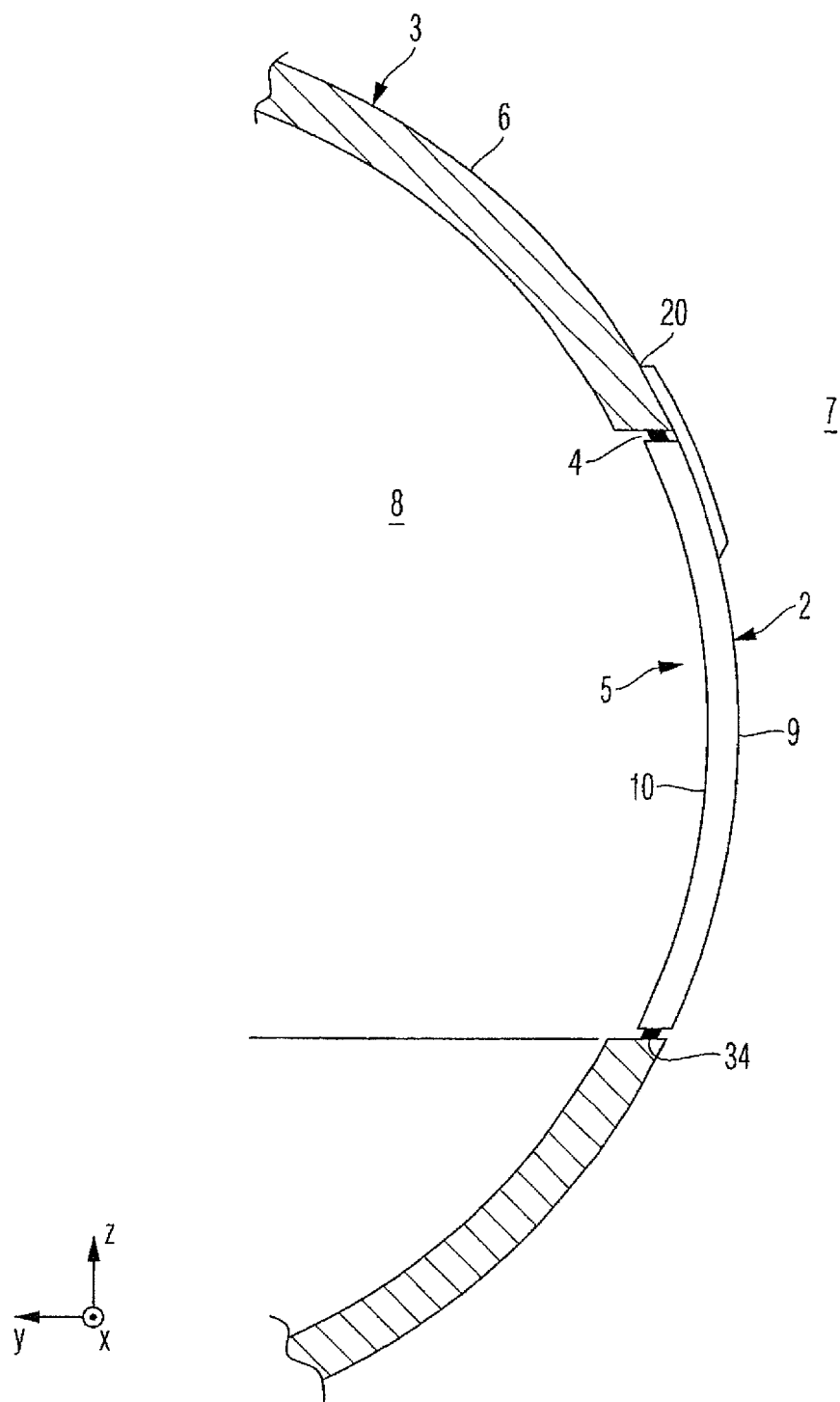
FIG. 3 is a sectional view of the preferred embodiment of the cover plate along line of FIG. 2.
Figure 4:
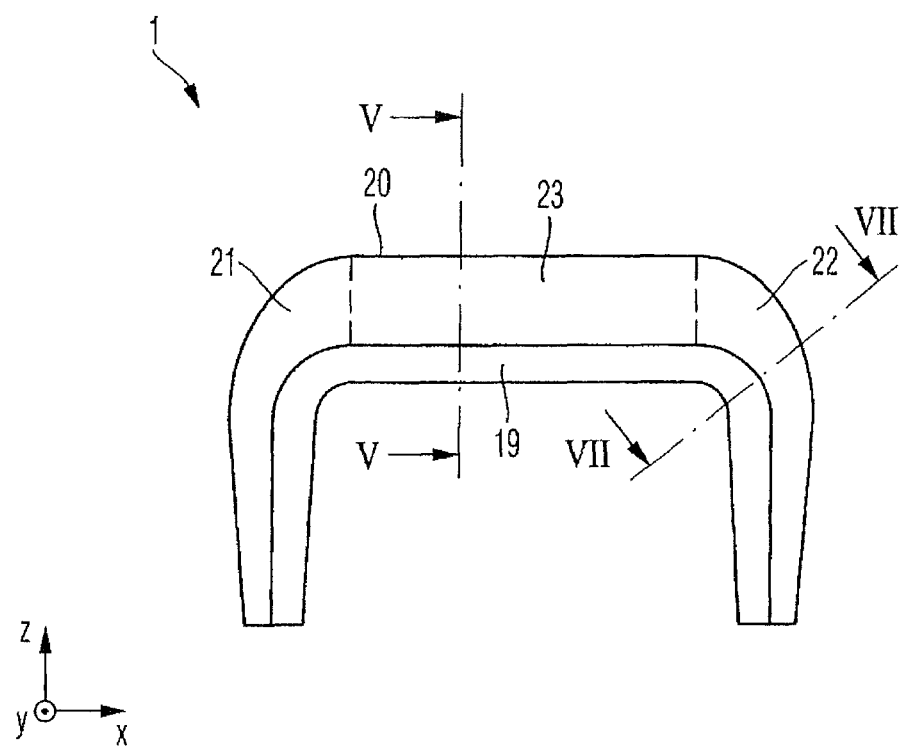
FIG. 4 is an enlarged plan view of the preferred embodiment of the cover plate according to FIG. 1.

FIGS. 1 to 4, to which reference will be made simultaneously, illustrate a preferred embodiment of a cover plate 1 for covering a door gap 4 formed between a door covering 2 and a fuselage cell 3 of an aircraft or spacecraft. The cover plate 1 is preferably configured as a so-called cover plate 1.

The fuselage cell 3 preferably has an access opening 5 which can be closed by the door covering 2. The door covering 2 is also known as the door leaf 2. Passengers or any loads, for example, can pass into the fuselage cell 3 through the open access opening 5. The door covering 2 is preferably mounted on the fuselage cell 3 such that it can swivel thereon by a hinge means. The door gap 4 is formed between the door covering 2 and the access opening 5. The door gap 4 can run round the entire door covering 2. The door gap 4 is preferably only formed on an outer skin 6 of the fuselage cell 3, in other words the door gap 4 preferably does not form a connection between the exterior 7 and interior 8 of the fuselage cell 3. The door covering 2 preferably has an outer surface 9 facing the exterior 7 and an inner surface 10 facing the interior 8 of the fuselage cell 3. In particular, the door covering 2 can terminate with the access opening 5 in a gas-tight manner by a sealing means 34 arranged in the door gap 4. A coordinate system of the fuselage cell 3 has an x direction or longitudinal direction, a y direction or transverse direction and a z direction or vertical direction.

The door covering 2 is in particular substantially rectangular, it being possible for it to also be curved in accordance with a contour of the fuselage cell 3. In particular, the door covering 2 has four corners 11-14 which are rounded in particular. The door covering 2 also has two sides 15, 16, in particular narrow sides 15, 16, oriented in the longitudinal direction x of the aircraft and two further sides 17, 18, in particular long sides 17, 18, oriented in the vertical direction z of the aircraft. The narrow side 15 is preferably configured as the upper edge 15 of the door covering 2 and the narrow side 16 is configured as the lower edge 16 of the door covering 2. The cover plate 1 is preferably mounted on the upper edge 15 of the door covering 2. The cover plate 1 can be screwed, riveted and/or bonded to the door covering 2, in particular to the outer surface 9 of the door covering 2.

The cover plate 1 preferably has a fastening portion 19 by which the cover plate 1 can be mounted on the outer surface 9 of the door covering 2. The fastening portion 19 is preferably approximately in the shape of a downwardly open, horizontal C. The cover plate also has a contact portion 20 which rests in a contacting manner on the outer skin 6 of the fuselage cell 3 when the door covering 2 is closed. The contact portion 20 is preferably configured as a linear contact portion 20. The contact portion 20 is preferably also in the shape of a horizontal C. A leading edge of the cover plate is preferably the contact portion 20. In particular, the cover plate 1 has at least one corner portion 21 associated with one of the corners 11-14 of the door covering 2. The cover plate 1 has in particular two corner portions 21, 22. For example, a first corner portion 21 is associated with corner 11 and a second corner portion 22 of the cover plate 1 is associated with corner 12 of the door covering 2. In the following, reference will merely be made to corner portion 21 for the sake of simplicity. The second corner portion 22 is preferably configured analogously, but mirror-inverted, to the first corner portion 21. The first corner portion 21 runs round, for example, the corner 11 of the door covering 2 and extends in the negative z direction of the fuselage cell 3 from the upper edge 15 of the door covering 2 at least in portions in the direction of the lower edge 16 thereof. The corner portion 21 is preferably rounded.

The cover plate 1 preferably has a side portion 23 associated with one side, in particular one of the narrow sides 15, 16 of the door covering 2. The side portion 23 is preferably arranged between the corner portions 21, 22. The at least one corner portion 21 and the side portion 23 are preferably configured to press the contact portion 20 against the outer skin 6 of the fuselage cell 3 with a constant contact pressure when the door covering 2 is closed. In the present context, "under a constant contact pressure" is understood as meaning that the contact portion 20 is pressed against the outer skin 6 with substantially the same contact pressure in the region of the at least one corner portion 21 as well as in the region of side portion 23.

Figure 5:
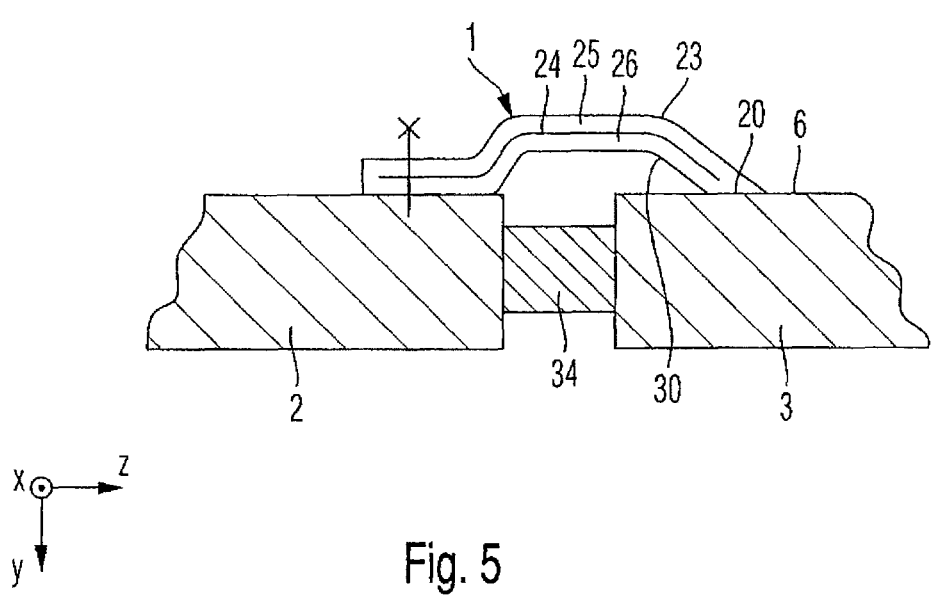
FIG. 5 is a sectional view of the preferred embodiment of the cover plate along line V-V of FIG. 4.
Figure 6:
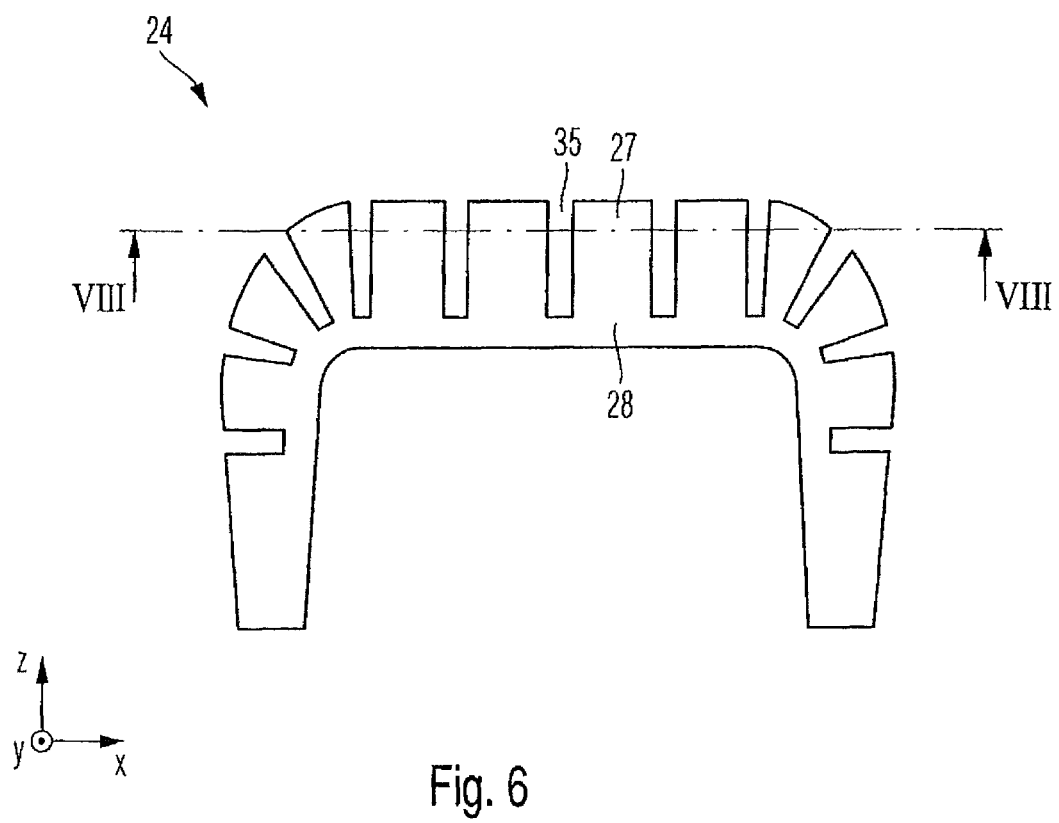
FIG. 6 is a plan view of a preferred embodiment of a core of the cover plate according to FIG. 1.
Figure 7:
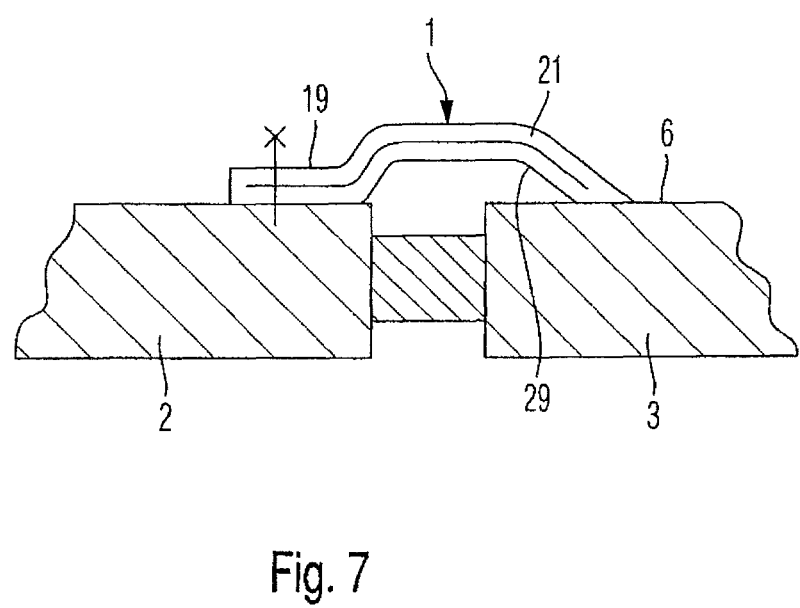
FIG. 7 is a sectional view of the preferred embodiment of the cover plate along line VII-VII of FIG. 4.

As illustrated in FIGS. 5 to 8, the cover plate 1 preferably has a core 24 which is arranged in particular between two skin layers 25, 26 of the cover plate 1. FIGS. 5 and 7 are sectional views, rotated by 90°, along lines V-V and VII-VII of FIG. 4. The skin layers 25, 26 preferably completely surround the core 24. The skin layers 25, 26 comprise in particular a plastics material, preferably a fibre-reinforced plastics material. The fibre-reinforced plastics material can comprise carbon fibres, glass fibres or the like. The skin layers 25, 26 can be configured integrally with the core 24. The core 24 is preferably configured as a metal core 24. Alternatively, the core 24 can be formed by a fibre-reinforced plastics material. For example, the core 24 can comprise a carbon fibre-reinforced plastics material or the like.

As illustrated in Fig, 6, the core 24 comprises in particular a plurality of core elements, only one element 27 of which being provided with a reference numeral. The core elements 27 can be completely separated from one another or can optionally be joined together by a web 28. The web 28 is preferably associated with the fastening portion 19 of the cover plate 1. The core elements 27 can be arranged spaced apart from one another by slots 35 or can be immediately adjacent to one another. The core 24 is particularly in the shape of a horizontal C. The core elements 27 are preferably configured as metal elements 27. Alternatively, the core elements 27 can be configured as fibre-reinforced plastic elements, for example as carbon fibre-reinforced plastic elements. The core 24 can comprise any number of core elements 27.

To produce a constant contact pressure by the at least one corner portion 21 and by the side portion 23 onto the outer skin 6 of the fuselage cell 3, as illustrated in FIG. 7 the at least one corner portion 21 preferably has a first precurvature 29 directed towards the outer skin 6 of the fuselage cell 3, and as illustrated in FIG. 5, the side portion 23 has a second precurvature 30 directed towards the outer skin 6 of the fuselage cell 3. The core 24 preferably also has the first and second precurvatures 29, 30. In particular, the second precurvature 30 is greater than the first curvature 29. In particular, the second precurvature 30 merges continuously into the first precurvature 29 in a transitional region between the side portion 23 and the at least one corner portion 21. As a result, a smooth transition is achieved and an abrupt transition from the first precurvature 29 into the second precurvature 30 is avoided. The second precurvature 30 is preferably not constant over the entire side portion 23, but preferably runs in an increasingly pronounced manner from the at least one corner portion 21 in the x direction up to the centre of the side portion 23. The second precurvature 30 is preferably greatest in the centre of the side portion 23. The first precurvature 29 preferably varies over a course of the corner portion 21. For example, the first precurvature 29 is greatest at a transition of the corner portion 21 to the side portion 23 and decreases towards an end portion 33 remote from the side portion 23.

In a preferred embodiment of the cover plate 1 in which, for example, the core 24 is configured with the plurality of core elements 27, the individual core elements 27 can have curvatures which vary in each case from one core element 27 to another and are directed towards the outer skin 6 of the fuselage cell 3 to realise the first precurvature 29 and the second precurvature 30 of the cover plate 1.

Alternatively or in addition, to achieve a constant contact pressure of the contact portion 20 against the outer skin 6 of the fuselage cell 3, the at least one corner portion 21 can have a first rigidity and the side portion 23 can have a second rigidity. In the present context, the first rigidity and second rigidity are to be interpreted in each case as construction rigidity and/or as material rigidity. The term "construction rigidity" is understood as meaning that the desired rigidity of the at least one corner portion 21 and/or of the side portion 23 can be respectively adjusted by means of an appropriate construction method, for example by an appropriate layer construction or by an appropriate component shape. The term "material rigidity" is understood as meaning that the desired rigidity of the at least one corner portion 21 and/or of the side portion 23 can be respectively adjusted by an appropriate material selection, for example by using different materials. The second rigidity is preferably greater than the first rigidity.

Figure 8:
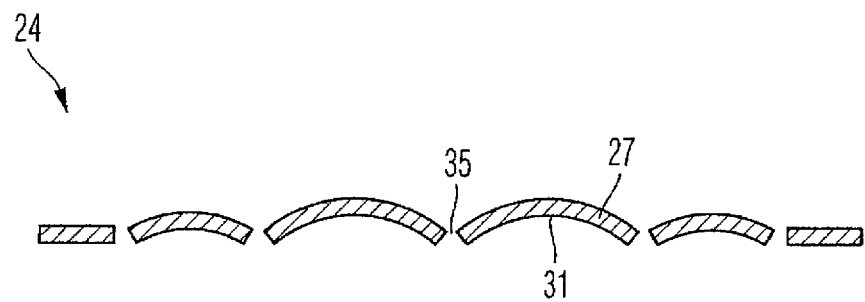
FIG. 8 is a sectional view of the preferred embodiment of the core along line VIII-VIII of FIG. 6.

In particular, the core elements 27 of the core 24 can have rigidities which vary from one core element 27 to another to produce the first and second rigidities. This can be achieved, for example by appropriate construction of the core 24, in particular by an appropriate core shape and/or by an appropriate choice of material. As illustrated in FIG. 8, these different rigidities can be produced, for example, by introducing a third precurvature 31 into the individual core elements 27. The third precurvature 31 is preferably oriented approximately vertically to the first precurvature 29 of the at least one corner portion 21 or to the second precurvature 30 of the side portion 23. This means that the individual core elements 27 can have two curvature directions in each case. Thus, an appropriate adjustment of the precurvatures 29, 30, 31 can influence the precurvature of the cover plate 1 in the direction of the outer skin 6 as well as the rigidity of the individual core elements 27. As a result, it is possible to achieve a constant pretension over the entire extent of the contact portion 20 when the door covering 2 is closed and when the contact portion 20 rests against the outer skin 6 of the fuselage cell 3. Consequently, the contact portion 20 rests reliably on the outer skin 6 and the development of vibrations due to certain regions of the contact portion 20 lifting away from the outer skin 6, for example on account of an air flow, is reliably prevented during operation of an aircraft or spacecraft having a cover plate 1 of this type.

Alternatively, the first rigidity of the corner portion 21 and the second rigidity, differing therefrom, of the side portion 23 can be produced for example by adjusting the material characteristics of the core 24. In particular, the core 24 can be reinforced as required, for example by reinforcing with fibres.

Figure 9:
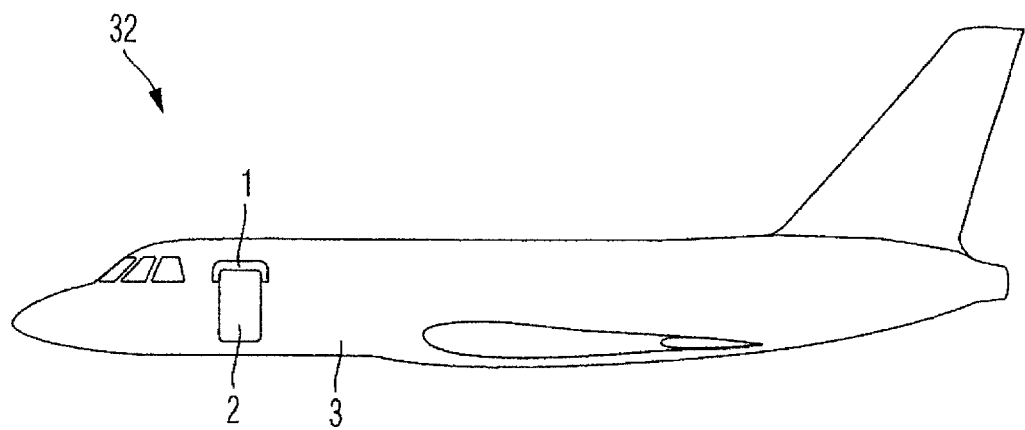
FIG. 9 is a side view of a preferred embodiment of an aircraft or spacecraft having a cover plate according to FIG. 1.

FIG. 9 illustrates a preferred embodiment of an aircraft or spacecraft 32 having a cover plate 1 of this type and/or having a door covering 2 of this type. The aircraft or spacecraft comprises the fuselage cell 3 with the access opening 5 provided in the fuselage cell 3. The door covering 2 is mounted such that it can swivel in the access opening 5 by a hinge means. After the access opening 5 has been closed, the contact portion 20 of the cover plate 1 rests in a continuously contacting manner on the outer skin 6 of the fuselage cell 3. An undesirable lifting-away of the cont portion 20 from the outer skin 6 is prevented by the constant pretension of the cover plate 1, as a result of which the development of vibrations and thus of noise is reliably prevented.

The materials, numerical information and dimensions which have been given are to be understood as examples and serve merely to describe the embodiments and developments of the present invention.

Of course, it is also possible to use the invention in other fields, particularly in vehicle construction or shipbuilding.

What is claimed is:

1. A cover plate for covering at least portions of a door gap formed between a door covering and a fuselage cell of an aircraft or spacecraft, the cover plate comprising:
    a fastening portion configured to mount on an outer surface of the door covering;
    a contact portion configured to rest in a contacting manner against an outer skin of the fuselage cell when the door covering is in a closed position;
    at least one corner portion associated with a corner of the door covering having a first precurvature directed towards the outer skin of the fuselage cell;
    a side portion mounted to a side of the door covering having a second precurvature directed towards the outer skin of the fuselage cell;
    wherein the second precurvature is not constant over an entirety of the side portion; and
    wherein the at least one corner portion and the side portion are capable to press the contact portion with a constant contact pressure against the outer skin of the fuselage cell when the door covering is in the closed position.

2. The cover plate according to claim 1, wherein the second precurvature being greater than the first precurvature.

3. The cover plate according to claim 1, wherein the at least one corner portion has a first rigidity and in that the side portion has a second rigidity, the second rigidity being greater than the first rigidity.

4. The cover plate according to claim 1, wherein the cover plate comprises a core which is arranged between two skin layers of the cover plate.

5. The cover plate according to claim 4, wherein the skin layers comprise a plastics material, in particular a fibers-reinforced plastics material.

6. The cover plate according to claim 4, wherein the core comprises a plurality of core elements.

7. The cover plate according to claim 6, wherein the core elements have in each case different first or second precurvatures directed towards the outer skin of the fuselage cell and/or different rigidities.

8. A door covering for an access opening in a fuselage cell of an aircraft or spacecraft having a cover plate according to claim 1.

9. The door covering according to claim 8, wherein the cover plate is mounted on an upper edge of the door covering.

10. An aircraft or spacecraft having a door covering according to claim 8.

* * * * *